United States Patent [19]
Canicatti

[11] 3,869,667
[45] Mar. 4, 1975

[54] VOLTAGE MONITORING SYSTEM
[75] Inventor: Carl L. Canicatti, Savannah, Ga.
[73] Assignee: The United States of America as represented by the Administrator of the National Aeronautics and Space Administration, Washington, D.C.
[22] Filed: Apr. 6, 1973
[21] Appl. No.: 348,787

[52] U.S. Cl. .................................. 324/113, 324/102
[51] Int. Cl. ...................... G01r 13/04, G01r 27/28
[58] Field of Search........ 324/113, 102, 133, 103 R, 324/103 P; 346/109

[56] References Cited
UNITED STATES PATENTS

| | | | |
|---|---|---|---|
| 1,958,897 | 5/1934 | Leyland | 346/109 |
| 2,915,359 | 12/1959 | Paine | 346/109 |
| 3,166,375 | 1/1965 | Hathaway | 346/109 |
| 3,284,804 | 11/1966 | Sell | 346/109 |

Primary Examiner—Alfred E. Smith
Assistant Examiner—Ernest F. Karlsen
Attorney, Agent, or Firm—James O. Harrell; John R. Manning

[57] ABSTRACT

A system for monitoring the voltage at a remote location for determining when the voltage exceeds upper and lower levels. The system includes transmission lines for transmitting the voltage back to a central station and applying such to an amplifier means having a pair of outputs. One of the outputs of the amplifier means is applied to an oscillograph. The other output is fed through an isolation transformer, a full wave rectifier to a pair of unijunction transistor circuits for producing pulses when the voltage exceeds or drops below a predetermined level. These pulses, in turn, energize a relay which turns on the oscillograph for recording the voltages being monitored.

6 Claims, 2 Drawing Figures

VOLTAGE MONITORING SYSTEM

ORIGIN OF INVENTION

The invention described herein was made by an employee of the United States Government, and may be manufactured and used by or for the Government for governmental purposes without the payment of any royalties thereon or therefor.

BACKGROUND OF THE INVENTION

This invention relates generally to a system for monitoring voltages, and more particularly to a system for recording voltages when the voltages exceed an upper and a lower level.

It is very important, especially where sensitive recording equipment, computers and other instruments, which depend on a steady voltage to know exactly when the supply voltage to the instruments varies above or below a predetermined level. Frequently, as a result of power supply variation, lightning strikes, unwanted circuit breaker operations, and other electrical malfunctions, transient voltages often occur on instrumentation buses. Such transient voltages may possibly cause loss of information or the storing of false information in the instrument connected thereto. The search for the cause of a malfunction due to a transient results in excessive man-hours. Therefore, it is extremely important to provide a record of any voltage variation above and below a predetermined level.

While there are several systems presently being utilized for monitoring voltages, these systems generally are relatively complex and expensive. Therefore, it is desired to have a relatively simple system for monitoring voltages appearing on instrumentation busses and the like, at remote stations which can utilize conventional telephone lines for transmitting voltage variations back to a central station so as to record these voltage variations on the equipment located at the central station. It is very time consuming, expensive, and sometimes dangerous to go to each individual substation with the appropriate equipment to monitor the voltages on location.

The subject invention utilizes a system which reduces the voltage at the substation so that it can be transmitted over a telephone line. A voltage analyzer is located at a central station, and includes an amplifier means having a pair of outputs. The received voltage is amplified by the amplifier and fed to an oscillograph coupled to one of its outputs. The other output of the amplifier feeds the signal to a full wave rectifier. Coupled to the output of the full wave rectifier is an over-voltage sensing unijunctional transistor and an under-voltage sensing unijunctional transistor. The unijunctional transistor circuits are adjusted so that if the voltage level rises above a predetermined value or below a predetermined value, such produces identifying pulses. These pulses are fed through a Darlington circuit for energizing a relay. The relay contacts are coupled between a power source and oscillograph for turning on the oscillograph to record the abnormal voltages.

Accordingly, it is an important object of the present invention to provide a monitoring system for monitoring voltages at a remote station.

Still another important object of the present invention is to provide a system for turning on oscillographs at a central station responsive to variations in voltages at a remote station.

Still another important object of the present invention is to provide a trigger circuit which generates pulses responsive to voltages rising above or dropping below a predetermined level for turning on a recording mechanism for recording the voltages.

These and other objects and advantages of the invention will become more apparent upon reference to the following specification, attendant claims and drawings.

DESCRIPTION OF THE PREFERRED EMBODIMENT

Figure 1:
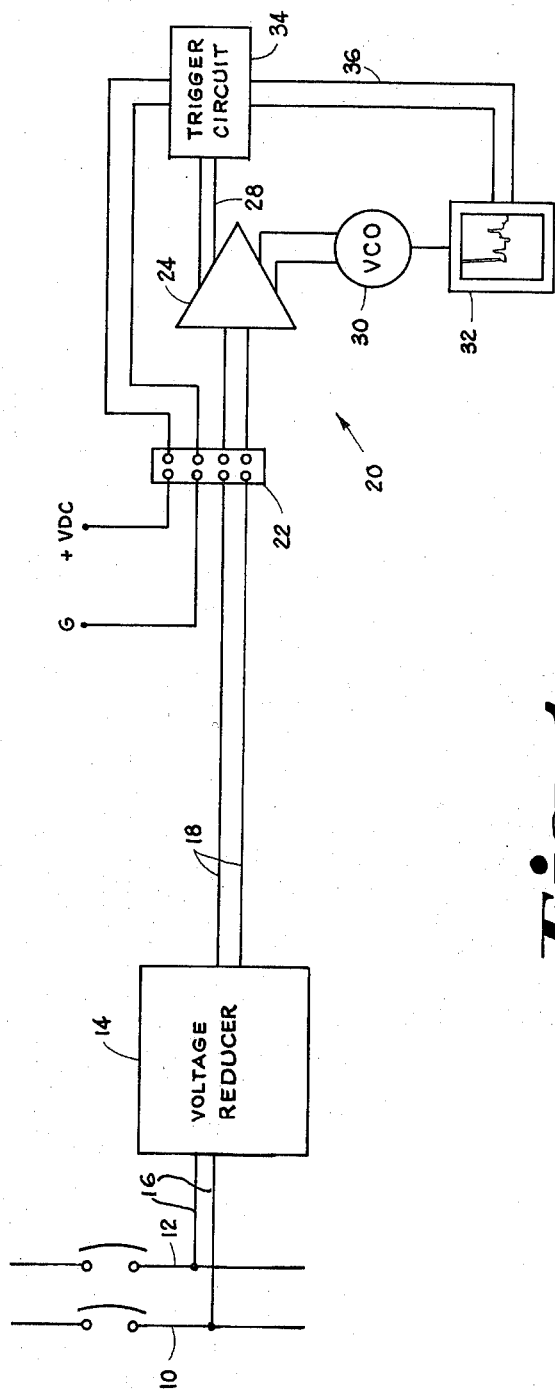
FIG. 1 is a block diagram of a monitoring system constructed in accordance with the present invention.

Referring in more detail to FIG. 1 of the drawings, there is illustrated a plurality of busbars 10 and 12 having voltage thereon, which is desired to be monitored. These busbars 10 and 12 are normally located at a remote station. A power interface circuit 14 is coupled to the busbars by means of leads 16 for reducing the voltages to a level so that such can be transmitted over conventional telephone lines 18. The telephone lines 18 carry the voltage to a centrally located control station that has an analyzing circuit generally designated by the reference character 20 located therein. The telephone lines 18 are connected to terminals of the terminal strip 22. Also, connected to the terminal strip 22 is an amplifier circuit 24 which amplifies the voltages coming in over leads 18. The amplifier 24 has a pair of outputs 26 and 28. The output 26 is fed to a voltage control oscillator 30, which in some instances is necessary to condition the signal so that such is compatible with an input of certain types of oscillographs 32. Sometimes it is not necessary to utilize a voltage control oscillator.

Connected to the other output 28 of the amplifier 24 is a trigger circuit 34 which senses when the voltage which is being analyzed exceeds an upper or lower predetermined level. If the voltage exceeds these levels, a signal is produced and fed over leads 36 to the oscillograph 32 for turning on the oscillograph. Since the oscillograph 32 is designed to operate at a relatively high speed so as to produce a very detailed graph of the voltage, it can be seen that it is only desirable to turn on the oscillograph when there is a transient or abnormal voltage on the busbars 10.

Figure 2:
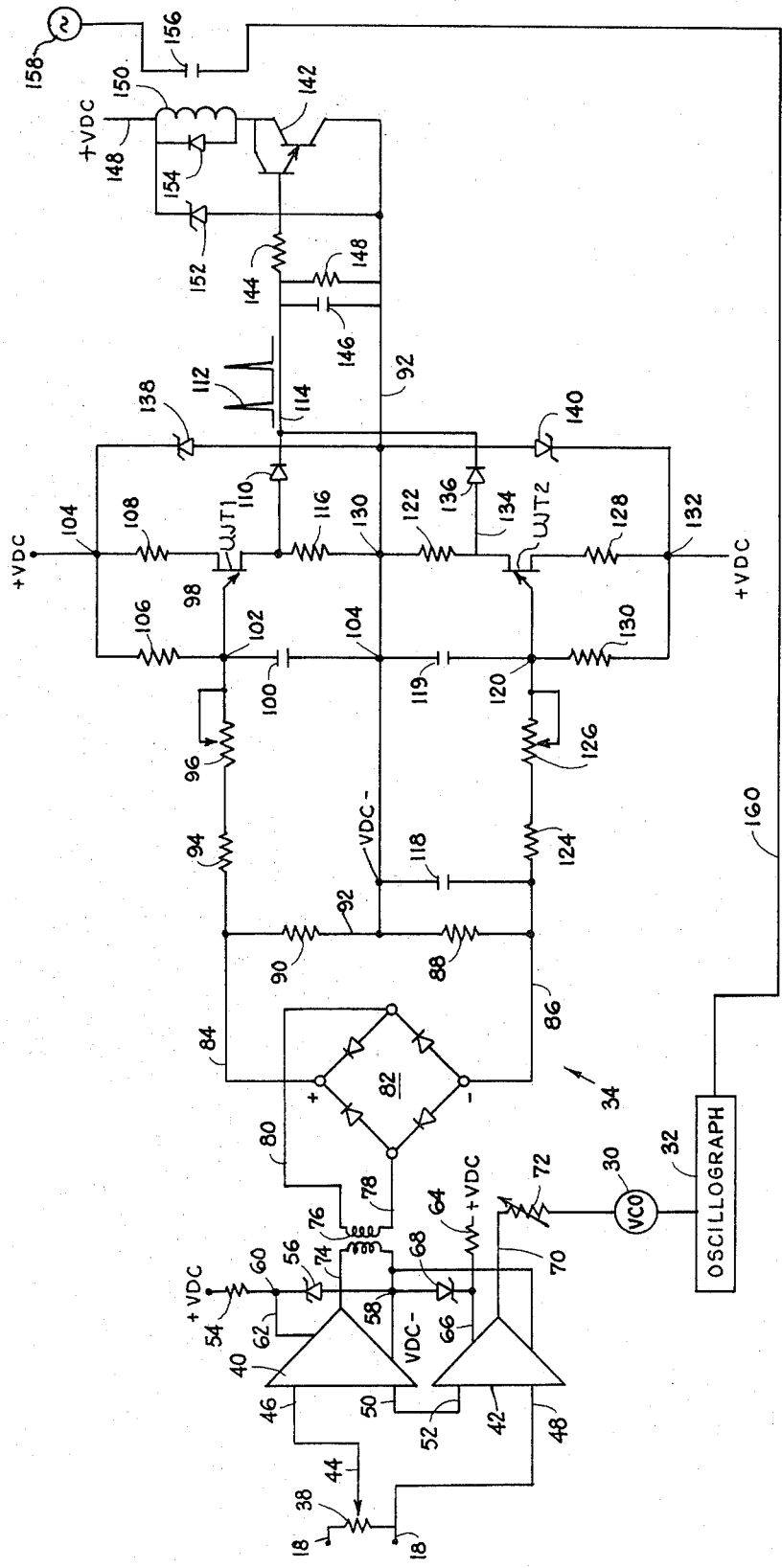
FIG. 2 is a detailed schematic diagram illustrating an analyzing circuit forming a part of the subject invention.

Referring in more detail to FIG. 2 of the drawings, there is illustrated a schematic diagram of the trigger circuit. The signals coming in over the telephone lines 18 are fed into a variable resistor 38 which can be adjusted so that only a portion of the voltage is applied to the inputs of amplifier means which includes amplifiers 40 and 42 to insure that the input voltage does not overdrive the amplifiers 40 and 42. A wiper arm 44 of the variable resistor 38 is coupled to one input 46 of the amplifier 40. The other lead 18 is coupled directly to the input 48 of the amplifier 42 so that the reduced voltage is applied across the leads 46 and 48. The common leads 50 and 52 of the amplifiers 40 and 42, respectively, are tied together.

Power is supplied to the amplifier 40 from a positive direct current voltage source through a resistor 54. A Zener diode 56 is coupled between a common junction 58 and a junction 60, which is coupled to a power supply lead 62 being fed into amplifier 40. Amplifier 42 is similarly wired so as to receive a positive DC voltage through resistor 64 to an input power lead 66. Zener diode 68 is coupled between the input power lead 66 and the common junction 58 so as to provide a uniform voltage for operating the amplifiers 40 and 42.

The output of amplifier 42 is coupled by means of lead 70 through a variable resistor 72, a voltage control oscillator 30 to the oscillograph 32. The purpose of the variable resistor 72 is to adjust the amplified voltage from amplifier 42 so as to match the voltage requirement of the oscillograph 32.

The output of amplifier 40 is fed through the output terminal 74 to a primary winding of isolation transformer 76. The output winding of the isolation transformer 76 is coupled by leads 78 and 80 to a full wave rectifier 82. The primary purpose of the isolation transformer 76 is to minimize the problems encountered with ground.

The output of the full wave rectifier 82 is coupled across leads 84 and 86 to the portion of the trigger circuit which generates pulses when an over-voltage or under-voltage condition occurs.

The rectified voltage appears between leads 84 and 86 across resistors 88 and 90. Interposed between resistors 88 and 90 is a common lead 92 which extends through the trigger circuit. This lead 92 may be referred to as negative relative to the positive direct voltage source coming in at the indicated points in the circuit. If there is an over-voltage produced by a transient voltage, it appears across resistor 90 and is applied through resistor 94, variable resistor 96 to a control electrode 98 of unijunctional transistor UJT1. This over-voltage signal charges a capacitor 100 coupled between junctions 102 interposed in lead 84 and junction 104 interposed in lead 92. If the capacitor 100 charges above a predetermined level, which is controlled by the variable resistor 96, resistor 94 and a resistor 106 coupled between junction 102 and junction 104, then such turns on the unijunctional transistor UJT1. The capacitor 100 discharges through the unijunctional transistor UJT1 and resistor 116, and through diode 110 producing an output pulse 112 on output lead 114. The signals appearing on output lead 114 are in the form of pulses, such as shown in FIG. 2, and each time an over-voltage condition occurs such causes the capacitor 100 to charge and discharge through the unijunctional transistor UJT1 resistor 116 back to the common lead 104.

The purposes of resistors 106, 108 and 96 are to bias the unijunctional transistor UJT1 so that such is fired responsive to a voltage rising above a predetermined level.

In order to produce output signals which are responsive to under-voltage conditions, a unijunctional transistor UJT2 is provided for looking at the voltage developed across resistor 88. This under-voltage is applied across a filter capacitor 118 to a capacitor 119 connected between junction 104 and a junction 120 interposed in lead 86. When the charge on capacitor 119 exceeds a predetermined level such discharges through the unijunctional transistor UJT2 and resistor 122. Resistor 124 and variable resistor 126 interposed in lead 86 in combination with resistors 128 and 130 bias the unijunctional transistor UJT2 to a level so that such is turned on responsive to the voltage level developed across resistor 88 dropping below a predetermined value. When the unijunctional transistor UJT2, which is connected in the lead extending between a common junction 130 and a junction 132, which is coupled to a positive DC power supply is turned on by discharging capacitor 119, a pulse is produced. This pulse 112 is applied through lead 134, diode 136, to the output lead 114. In some particular embodiments, the resistors 124, 126, 128, 130 and 122 are so selected that the pulse appearing on the output lead 114 resulting from the firing of unijunctional transistor UJT2 is different from the pulse produced by the over-voltage condition. However, it is to be understood that the pulses produced by the over-voltage unijunctional transistor UJT1, as well as the under-voltage unijunctional transistor UJT2 is sufficient to activate the circuit on the right of the drawing which includes a relay for turning on the oscillograph 13. A Zener diode 138 is coupled between junction 104 and the common lead 92 to provide a regulated power supply to the unijunctional transistor UJT1. A Zener diode 140 is coupled between junction 132 and the common junction 92 for providing a uniform power supply to unijunctional transistor UJT2.

The output lead 114 is coupled to a control electrode of a Darlington transistor 142, through a resistor 144. A shunt capacitor and resistor 146 and 148 are coupled between lead 114 and common lead 92. A positive DC power supply is coupled to lead 148 and fed through a control coil of a relay 150 to the Darlington transistor 142. A Zener diode 152 is coupled between the lead 148 and the common lead 92 for applying a uniform power supply to the relay 150 and Darlington transistor 142. A suppressor diode 154 is connected in shunt with the control coil of the relay 150. When the pulses 112 appear on the output lead 114 as a result of the occurrence of either an over-voltage or under-voltage condition, such pulse turns on the Darlington transistor 142 for a predetermined duration controlled by capacitor 146. When the Darlington transistor 142 is turned on such allows the positive voltage appearing on lead 148 to energize relay 150. When relay 150 is energized its contact 156 is closed connecting an alternating voltage power source 158 to the oscillograph by means of lead 160 to turn on the oscillograph 32. The oscillograph 32 when turned on records the voltage signals which include the transients coming out of the second output lead 70 of amplifier 42.

In summarizing the operation of the circuit, the leads 16 are coupled to busbars 10 upon which the voltage that is desired to be monitored is imposed. These voltages are reduced by any suitable conventional voltage reducing device so that such can be transmitted over conventional telephone lines to a central station. At the central station there is located an analyzing circuit 34 which includes an amplifying means. This amplifying means includes a pair of amplifiers which amplifies the reduced signal. The output of the amplifier 42 is fed into the oscillograph 32 for being recorded. It is not desired to operate an oscillograph continuously since the paper used therein is relatively expensive and normally it is desired to operate it at a relatively high rate of speed. In order to turn on the oscillograph responsive to an over-voltage or under-voltage condition a trigger circuit which incorporates an over-voltage unijunctional transistor UJT1 and an under-voltage unijunctional transistor UJT2 is provided. The output voltage from the amplifier 40 is fed through an isolation transformer 76 and rectified by a full wave rectifier 82. Positioned across the output of the full wave rectifier 82 are a pair of resistors 90 and 88. The voltage impressed across the resistor 90 is looked at by the over-voltage unijunctional transistor UJT1 and when such exceeds a predetermined level causes the unijunctional transistor UJT1 to turn on producing a pulse on the output lead 114.

The under-voltage condition is sensed by a unijunctional transistor UJT2 which looks at the voltage across resistor 88. When the under-voltage condition occurs the unijunctional transistor UJT2 is turned on, also, producing a pulse on the output lead 114. The pulses 112 appearing on the output lead 114 are applied through various circuitry to turn on a Darlington transistor 142. Connected in series with the Darlington transistor 142 is a control coil of a relay which closes its contacts 156 upon energization of the Darlington transistor 142. When contacts 156 are closed power is supplied by lead 160 to the oscillograph for turning on the oscillograph for recording the voltage coming out of the amplifier 42. From analyzing these voltage signals such aids an operator in locating an identifying transient voltage.

While a preferred embodiment of the invention has been described using specific terms, such description is for illustrative purposes only, and it is to be understood that changes and variations may be made without departing from the spirit or scope of the following claims.

What is Claimed is:

1. A system for monitoring the voltage at a remote location for determining when said voltage exceeds an upper level or drops below a lower level comprising:
    A. voltage reducing means coupled to said voltage to be monitored for reducing said voltage to a predetermined level,
    B. a voltage analyzer located at a station remote from said voltages being monitored,
    C. transmission lines coupled to said voltage reducing means for transmitting said reduced voltage to said voltage analyzer,
    D. said voltage analyzer including:
    E. an amplifier means for amplifying said reduced voltage producing an amplified voltage,
    F. a full wave rectifier coupled to said amplifier means for rectifying said amplified voltage producing a rectified signal,
    G. an over-voltage sensing unijunction transistor coupled to said full wave rectifier for being activated when said voltage rises above an upper predetermined voltage level, to produce an over-voltage signal,
    H. adjustable resistor means interposed between said over-voltage sensing unijunction transistor and said full wave rectifier for controlling the upper voltage level that said over-voltage sensing unijunction transistor is activated,
    I. an under-voltage sensing unijunction transistor coupled to said full wave rectifier for being activated when said voltage drops below a predetermined lower level to produce an under-voltage signal,
    J. adjustable resistor means interposed between said under-voltage sensing unijunction transistor and said full wave rectifier for controlling the lower voltage level that said under-voltage sensing unijunction transistor is activated, and
    K. recorder means coupled to an output of said amplifier means whereby said recorder records said amplified voltage so that it can be subsequently analyzed,
    L. means coupled to the outputs of said over-voltage and under-voltage unijunction transistors for activating said recorder means responsive to receiving an over-voltage or under-voltage signal.

2. The system as set forth in claim 1, wherein said means coupled to said over-voltage and under-voltage unijunction transistor for activating said recorder includes;
    A. an electronic switching circuit, and
    B. a relay coupled to said electronic switching circuit for being energized to activate said recorder means responsive to said switching circuit receiving an over-voltage or under-voltage signal.

3. The system as set forth in claim 1 wherein:
    A. said amplifier means has a pair of outputs,
    B. one of said outputs of said amplifier means being connected to said full wave rectifier, and
    C. the other output of said amplifier means is connected to said recorder means.

4. The system as set forth in claim 2 further comprising:
    A. a source of power,
    B. said electronic switching circuit includes a Darlington transistor circuit, and
    C. a relay having contacts interposed between said source of power and said recorder means so that when said Darlington circuit is energized said relay is energized closing its contacts for applying power to turn on said oscillograph.

5. The system as set forth in claim 1 further comprising:
    A. an isolation transformer interposed between said amplifier means and said full wave rectifier.

6. A system for monitoring the voltage at a remote location for determining when said voltage exceeds an upper level or drops below a lower level comprising:
    A. voltage reducing means coupled to said voltage to be monitored for reducing said voltage to a predetermined level,
    B. a trigger circuit located at a station remote from said voltage being monitored.
    C. transmission lines coupled to said voltage reducing means for transmitting said reduced voltage to said trigger circuit,
    D. said trigger circuit including:
    E. an amplifier means having an input coupled to said transmission lines and a pair of outputs, said amplifier means amplifying said reduced voltage producing amplified voltages on said outputs,
    F. an oscillograph coupled to one of said outputs of said amplifier means,
    G. an over and under-voltage pulse producing means coupled to said other output of said amplifier means for producing pulses responsive to said voltage exceeding said upper and lower levels,
    H. said over and under-voltage pulse producing means including a pair of unijunction transistors which produce said pulses responsive to said voltage exceeding said upper and lower levels,
    I. a source of power, and
    J. relay means coupled to said pulse producing means and said oscillograph for connecting said source of power to said oscillograph to turn said oscillograph on responsive to receiving a pulse from said over or under-voltage pulse producing means,
    K. whereby said oscillograph records said voltages exceeding said upper and lower levels.

* * * * *